Patented Mar. 19, 1946

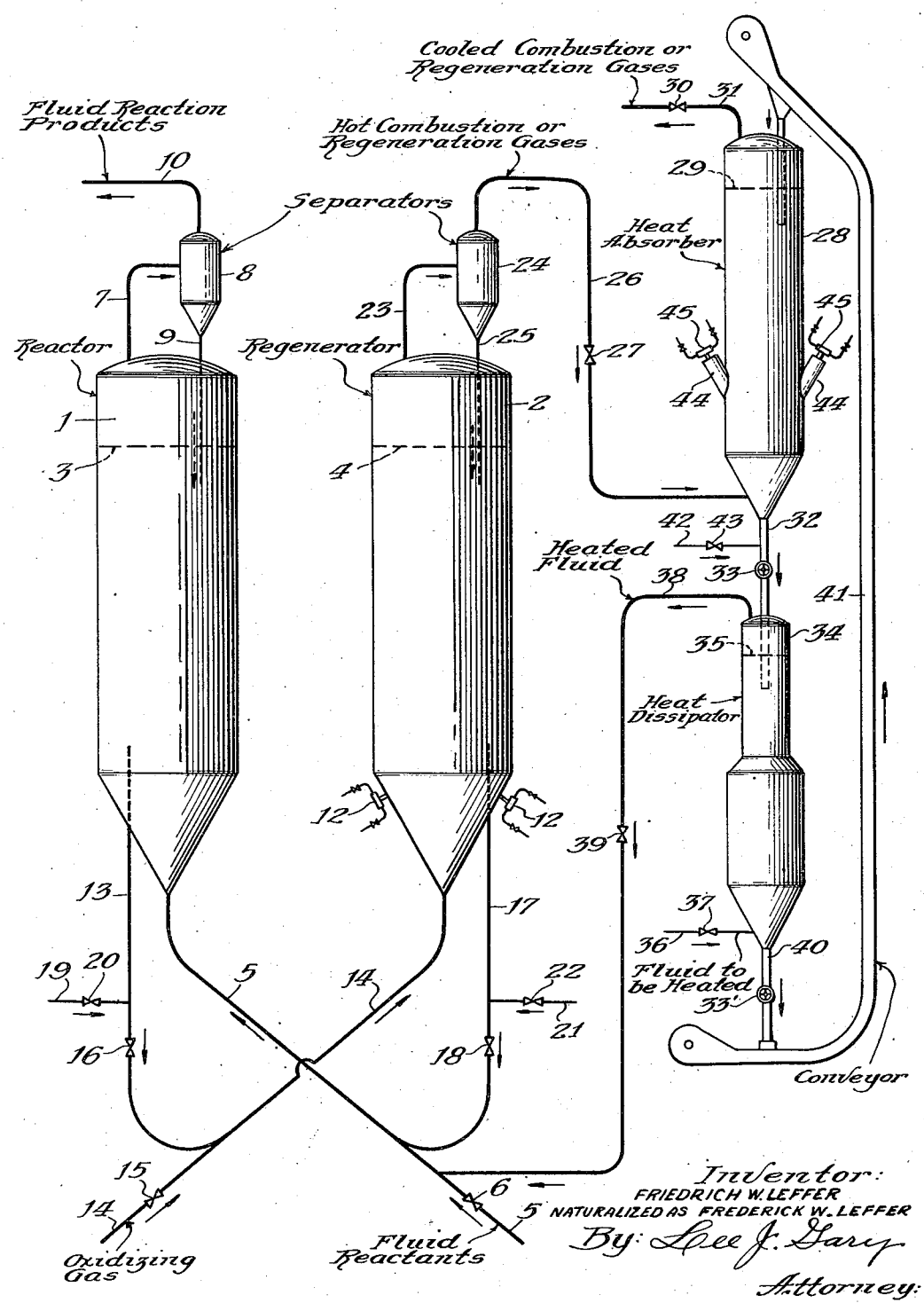

2,396,709

UNITED STATES PATENT OFFICE 2,396,709

CONVERSION OF FLUID REACTANTS

Friedrich W. Leffer, naturalized as Frederick W. Leffer, Chicago, Ill., assignor to Universal Oil Products Company, Chicago, Ill., a corporation of Delaware Application March 24, 1943, Serial No. 480,357

9 Claims. (Cl. 196—52)

The invention is directed to an improved process for the conversion of fluid reactants in the presence of a mass of subdivided solid contact material which may be relatively inert or may possess catalytic activity for promoting the desired reaction or for retarding undesirable secondary or side reactions The process provided is of the general type in which deleterious heavy conversion products are deposited in the contact mass during the conversion reaction and wherein a stream of the contaminated contact material is continuously supplied from the reaction zone to a regenerating zone in which a mass of the latter is maintained and the contaminants removed therefrom by an exothermic reaction, resulting regenerated contact material being continuously returned from the regenerating zone to the mass thereof in the reaction zone. In such operations a substantial portion of the heat evolved in the regenerating step is stored in the subdivided solid contact material undergoing regeneration and supplied therewith to the reaction zone to furnish at least a substantial portion of the heat required for conducting endothermic conversion of the reactants supplied to the latter. However, a considerable quantity of the heat evolved in the regenerating step is removed from the regenerating zone in the outgoing stream of spent or partially spent regenerating gas and the primary object of the invention is to provide an improved method of continuously recovering heat from the outgoing regenerating gas stream.

A further object of the invention is to transmit heat recovered from the outgoing regenerating gas to the reaction zone in a fluid medium which may be either a portion or all of the reactants to be endothermically converted or may be an auxiliary fluid employed in the reaction zone for some useful purpose in addition to its function as a heat-carrying medium.

The method provided by the invention for recovering useful heat from the outgoing regenerating gas obviates the use of costly tubular type heat exchangers or the like by employing a moving mass of subdivided solid heat retentive material which is heated as it moves through a confined zone by direct contact with the outgoing hot regenerating gas and which is transferred in heated state to a separate confined zone through which it moves in direct contact with the fluid to be heated and supplies heat to the latter, the resulting cooled contact material being continuously returned from the last named zone to the first named zone to establish a closed cycle through which it is continuously circulated.

The features of the invention are applicable to a wide variety of processes and the invention is not limited to the use of its features in conducting any specific reaction. However, it is particularly advantageous as applied to the conversion of hydrocarbons by such reactions as cracking and dehydrogenation, for example, and in one specific embodiment is particularly directed to hydrocarbon conversion reactions of this type employing either active catalyst or relatively inert subdivided solid contact material in the reaction zone and employing relatively inert gas, such as steam, for example, in the reactor to give a low effective pressure in the reaction zone and thereby facilitate conversion of the hydrocarbons to more valuable products, such as butadiene, acetylene, etc. In order to be specific and avoid ambiguities, the subsequent description will be directed principally to this type of operation as illustrative of the advantages which may be achieved by use of the features herein provided.

One specific embodiment of the process provided by the invention is as follows: The bed of subdivided solid contact material maintained in the reaction zone is kept in turbulent fluid-like condition by passing the fluid reactants and resulting vaporous and/or gaseous conversion products upwardly therethrough in contact with the solid particles at a net upward velocity greater than that of the latter, whereby the phenomena known as "hindered settling" is obtained. There is thus maintained in the reaction zone a relatively dense lower phase containing a high concentration of solid particles and a light upper phase containing a substantially lower concentration of solid particles. A similar fluid-like bed or dense phase of the subdivided solid contact material is maintained in the regenerating zone by passing oxidizing gas employed for burning combustible contaminants from the solid particles upwardly through the regenerating zone at a net upward velocity greater than that of the solid particles.

A stream of the solid contact material is continuously withdrawn from the dense phase or fluid bed in the reactor and, after being substantially stripped of readily vaporizable hydrocarbons, this stream is supplied to the dense phase or fluid bed in the regenerating zone. Another stream of the solid contact material is continuously withdrawn from the dense phase or fluid bed in the regenerating zone and, after being substantially stripped of oxygen-containing gas is supplied to the dense phase in the reaction zone.

Vaporous and/or gaseous hydrocarbon conversion products and entrained solid particles are directed from the light phase in the reactor to suitable separating equipment wherein at least a substantial portion of the solid particles are removed and from which they are returned to the dense phase or fluid bed in the reactor. The vaporous and/or gaseous reactants pass from the separating equipment. Hot regenerating gas is directed with entrained solid particles from the light phase in the regenerator to suitable separating equipment wherein all or a substantial portion of the solid particles are separated and from which they are returned to the dense phase in the regenerator.

Hot gases from the last mentioned separating equipment are directed to a confined zone through which they pass upwardly in countercurrent contact with a downwardly moving relatively compact mass of subdivided solid heat retentive material, such as, for example, fire-clay particles, calcined shale, quartz, sand, metal particles or the like, suitable for use under temperature conditions encountered in this zone and to which heat is supplied from the hot regenerating gas, the resulting cooled regenerating gas being discharged from the upper portion of this confined zone. The hot subdivided solid heat retentive material is directed from the last named zone into another confined zone wherein a downwardly moving bed thereof is countercurrently contacted with a suitable relatively inert fluid, such as steam or water for example, to supply heat thereto. The resulting highly heated fluid is directed from the upper portion of the last named zone into the lower portion of the fluid bed in the reactor and passes upwardly therethrough with the hydrocarbon reactants supplied to this zone and the resulting conversion products, thereby supplying heat to the reaction zone and reducing the effective pressure in the latter by the partial pressure effect of said relatively inert fluid. After contact with the relatively inert fluid to be heated, the subdivided solid heat retentive material is returned from the lower portion of the second named confined zone to the upper portion of the downwardly moving mass thereof in the first named confined zone to establish a closed cycle through which the heat retentive material is continuously passed.

The accompanying diagrammatic drawing illustrates one specific form of apparatus in which the improved process provided by the invention may be successfully conducted and the following description of the drawing includes a more detailed description of the specific embodiment of the invention above outlined.

The apparatus illustrated comprises a reactor 1 and a regenerator 2, each of which is a vertically disposed cylindrical vessel and within each of which a fluidized bed of subdivided solid contact material is maintained, as previously explained. The concentration of solid particles is materially less in the upper portion of each of these vessels than in its lower portion. The approximate line of demarkation between the light upper phase and the dense lower phase is indicated at 3 in the reactor and at 4 in the regenerator.

Hydrocarbon reactants to be converted are supplied, preferably in preheated, essentially vaporous state to the lower portion of reactor 1 through line 5 and valve 6, together with subdivided solid contact material supplied to line 5 from the regenerator, as will be later described. The preheated hydrocarbon vapors passing through line 5 carry the contact material principally by their gas-lift action and the commingled stream of preheated vaporous reactants and subdivided solid contact material entering the cone-shaped lower end of reactor 3 from line 5 is substantially uniformly distributed over the cross-sectional area of the vessel. The hydrocarbon vapors and resulting vaporous and gaseous conversion products pass upwardly through the reactor at a net upward velocity greater than that of the subdivided solid contact material. The greater gravitation attraction of the solid particles, as compared with the hydrocarbon vapors and gases, results in the phenomenon known as "hindered settling" in reactor 1, whereby a local circulation of the solid particles is obtained to give a turbulent fluid-like bed of the solid contact material in the reaction zone.

Vaporous and/or gaseous conversion products resulting from conversion of the hydrocarbons under the temperature and pressure conditions maintained in reactor 1 are directed, with entrained or suspended particles of the subdivided solid contact material, from the light upper phase in the reactor through line 7 to suitable equipment, such as, for example, the cyclone separator 8, wherein all or a major portion of the subdivided contact material is separated from the hydrocarbons. The separated solid material is returned, in the case illustrated, from the lower portion of separator 8 through standpipe 9 to the relatively dense phase in the reactor. The vaporous and/or gaseous hydrocarbon conversion products are directed from the upper portion of separator 8 through line 10 to suitable fractionating, condensing and recovery equipment not pertinent to the present invention and, therefore, not illustrated.

Conversion of the hydrocarbon reactants in reactor 1, in addition to producing the desired relatively light products, also results in the formation of appreciable quantities of heavier conversion products of a carbonaceous or hydrocarbonaceous nature. The latter accumulate on the particles of subdivided solid material comprising the fluid bed in the reactor and, to keep the solid contact material in heated state, a stream thereof is continuously supplied from reactor 1 to regenerator 2, wherein combustible deposits are continuously burned from the contact material, and a stream of the resulting highly heated contact material is continuously returned from the regenerator to the reactor.

To accomplish circulation of the solid contact material a stream or moving column thereof is directed downwardly from the fluid bed in reactor 1 through standpipe 13 into line 14 through which air or other oxygen-containing gas is passed. Introduction of the oxygen-containing gas is regulated by valve 15 in line 14 and standpipe 13 joins line 14 on the downstream side of valve 15. A suitable restriction, such as a valve or adjustable orifice indicated at 16, is disposed in standpipe 13 adjacent its lower end to regulate the flow of subdivided solid material from the standpipe into line 14. By commingling the oxygen-containing gas with the subdivided solid material in line 14, the density of the commingled materials in line 14 is considerably reduced as compared with that of the material passing through standpipe 13 above valve 16. Thus, the subdivided solid material is transported from the reactor to the regenerator, principally by the gas-lift action of the air or other oxygen-containing gas passing through line 14.

The stream of oxidizing gas and subdivided solid material is directed from line 14 into the substantially cone-shaped lower head of regenerator 2, wherein the oxidizing gas serves to burn the combustible deposits from the solid particles of contact material and wherein the upwardly flowing oxidizing gas and resulting combustion gases fluidize the bed of subdivided solid material in the regenerator in substantially the same manner as the bed in reactor 1 is fluidized by the vaporous hydrocarbon reactants and resulting vaporous and gaseous conversion products.

To complete the circuit of subdivided solid material, a stream or column of hot regenerated solid particles is directed from the fluid bed in regenerator 2 downwardly through standpipe 17, containing the adjustable orifice or flow control valve 18 adjacent its lower end, into line 5, wherein the solid material is commingled with the incoming hydrocarbon reactants and transported, principally by their gas-lift action, back to reactor 1 as previously described.

To prevent the transfer of hydrocarbon reactants and vaporous and gaseous conversion products from reactor 1 to regenerator 2 and to fluidize and prevent excessive compaction of the column of subdivided solid material in standpipe 13, this column is substantially stripped of hydrocarbon reactants and conversion products by introducing relatively small quantities of substantially inert gas, such as steam, for example, into the standpipe at one or a plurality of points above the valve or orifice 16. In the case illustrated, the stripping and fluidizing medium is introduced through line 19 and valve 20. In a similar manner, steam or other suitable stripping gas is introduced through line 21 and valve 22 into standpipe 17 to substantially strip the column of subdivided solid material therein of oxidizing gas and combustion gases and to fluidize the column and prevent excessive compaction of the solid particles.

The subdivided solid contact material employed may comprise material which will withstand the conditions of operation employed in reactor 1 and in regenerator 2 and which will not be detrimental to the desired reaction. It may have a minor or a pronounced catalyst effect for promoting the hydrocarbon conversion reaction or it may be a relatively inert material. I specifically contemplate the use of finely divided or solid cracking or dehydrogenating catalyst of any well known type which is capable of withstanding the operating conditions employed without fluxing or excessively rapid degradation in activity, but the process is also capable of operating with relatively inert, subdivided solid contact material, such as crushed fire-brick, calcined clays or shales, metals of suitable high melting point, sand, gravel, quartz and numerous other materials which will remain in subdivided solid state, will not detrimentally affect the conversion reaction and which are of sufficient density to retain a substantial portion of the heat generated by burning of the combustible deposits therefrom in the regenerating step. Preferably, when the desired reaction can be successfully accomplished without a relatively porous catalyst, a relatively dense and non-porous material is employed since it will have a greater heat-retaining ability than the less dense relatively porous catalyst commonly used for dehydrogenation or cracking and will not adsorb desirable vaporous and gaseous conversion products of the reaction. With this type of material, better heat transfer between the regenerating and the reaction step is accomplished and the waste of valuable conversion products by combustion thereof in the regenerating step is avoided.

Hot combustion gases resulting from burning of the carbonaceous or hydrocarbonaceous deposits in regenerator 2 are directed, together with suspended or entrained particles of subdivided solid material from the relatively light phase in regenerator 2 through line 23 to suitable separating equipment, such as the cyclone separator indicated at 24, wherein all or a substantial portion of the subdivided solid contact material is separated from the combustion gases. In the case illustrated, the thus separated contact material is returned from the lower portion of separator 24 through standpipe 25 to the dense phase or fluid bed in the regenerator.

Although a substantial portion of the heat generated in regenerator 2 will be stored in the subdivided solid material of the fluid bed maintained therein and returned with the regenerated material to reactor 1, to supply heat to the conversion reaction, the combustion gases discharged from the regenerating zone also contain a considerable quantity of heat and, due to the relatively high temperature of these gases, a large portion of the heat which they contain is readily available.

In accordance with the features of the invention, the hot spent or partially spent regenerating gas is directed from separator 24 through line 26 and valve 27 into a heat absorber comprising the elongated cylindrical vessel 28, wherethrough the gases flow countercurrent to and in direct contact with a downwardly moving bed of subdivided solid particles of suitable heat retention material to which they supply a substantial portion of their heat. Preferably, the bed of solid particles in vessel 28 comprises a continuous relatively compact mass rather than a fluidized mass of the type maintained in the reactor and regenerator, the approximate upper limit of this bed in vessel 28 being indicated at 29. Also, the particles comprising the bed are preferably granular or at least of substantially larger size than the fine solid particles contained in the hot gas stream supplied to vessel 28 through line 26 and the bed acts as an absorbent or filter bed for the fine solid particles in the gas stream. Thus, the regenerating gas stream discharged from the upper portion of vessel 28 through line 30 and valve 31 will not only be relatively cool, but will also be substantially free of entrained solid particles. This stripping of the outgoing regenerating gas is particularly advantageous when the subdivided solid material employed in the reactor and the regenerator is a relatively expensive catalyst, since it provides a means for recovering valuable catalyst fines from the outgoing regenerating gas.

When the heat absorber 28 is also used as a filter in the manner above described, it is within the scope of the invention to eliminate separator 24 or at least it is unnecessary to employ a complex or multi-stage separator of sufficient size to give a high recovery of entrained solid particles since their separation from the gases can be effected in vessel 28.

The hot subdivided solid or granular heat retentive material is continuously directed from the lower portion of vessel 28 through conduit 32 into another elongated cylindrical vessel comprising the heat dissipator 34, when desired, its flow from vessel 28 to vessel 34 may be controlled by suitable means, such as an adjustable orifice, slide valve, star feeder or the like, indicated at 33, in conduit 32, although such flow regulating means will not ordinarily be required.

A bed of the heat retentive solid material is maintained in vessel 34, the approximate upper limit of this bed being indicated at 35, and moves downward through the vessel counter-current to and in direct contact with the fluid to be heated in this zone. The latter is supplied to the lower portion of vessel 34 through line 36 and valve 37 and may comprise water, steam or other suitable fluid relatively inert to the reaction being conducted in reactor 1, or it may comprise a portion or all of the reactants to be converted in the reactor. For example, as applied to the high temperature cracking and dehydrogenation of normally gaseous or liquid hydrocarbons the stream supplied to vessel 34 through line 36 may be a mixture of the hydrocarbon reactants in either vaporous or liquid state with steam or water, or it may be the reactants alone or steam or water alone or another relatively inert fluid, such as light hydrocarbon gases, nitrogen, carbon dioxide or the like.

The bed of subdivided solid material passing through vessel 34 may, like the bed in vessel 28, comprise a relatively compact mass of solid particles or it may comprise a fluidized mass similar to the fluid beds in the reactor and regenerator. In the preferred embodiment of the invention, fluidization of the bed in vessel 34 is limited so as to avoid excessive turbulence which would tend to equalize temperatures between the upper and lower portions of the bed. In the particular case here illustrated, the upper portion of vessel 34 is of reduced cross-sectional area relative to its lower portion so that the velocity of the fluid supplied through line 36 is increased in the upper portion of the bed sufficiently to strip fine solid particles therefrom, whereas a materially lower velocity and relatively compact condition prevails in the lower portion of the bed. Thus, the solid particles and fluid undergoing heating flow through vessel 34 in a generally countercurrent direction, whereby the subdivided solid heat retentive material is discharged at a relatively low temperature from the lower portion of the vessel, while the heated fluid is discharged from the upper portion of the vessel at a temperature closely approaching that at which the heated solid material is supplied thereto from vessel 28.

The fluid heated in vessel 34 is directed from the upper portion of this zone through line 38 and valve 39 into line 5, wherein it assists in fluidizing and transporting to the reactor the solid particles supplied to line 5 from the regenerator through standpipe 17. The commingled materials in line 5 are directed therefrom, as previously described, into the lower portion of the fluid bed in the reactor.

When the solid particles entrained in the regenerating gas discharged from the regenerator are filtered from the gases in vessel 28 and stripped in vessel 34 from the larger solid particles passing through this zone, they will be directed with the heated fluid through line 38 and line 5 to the reactor for further use as components of the fluid bed maintained in this zone. In any event, the heated fluid supplied to the reactor from vessel 34 supplies heat recovered from the outgoing regenerating gas to the reaction zone and when it comprises or consists of steam or other relatively inert gas, it also serves to reduce the effective operating pressure in the reaction zone.

Subdivided solid heat retentive material from which heat has been abstracted in vessel 34 is directed from the lower portion of this zone through conduit 40 to a suitable continuous conveyer, indicated at 41, and motivated by any convenient well known means, not illustrated, whereby the solid particles are returned to the bed thereof maintained in the heat absorber 28 to give a continuous closed cycle through vessel 28, vessel 34 and through the conveyer back to vessel 28. When desired, suitable flow regulating means 33', like that indicated at 33, may be provided in conduit 40.

It is usually desirable to prevent regenerating gas from entering the reaction zone, since it may contain unused oxygen which would cause oxidation of the hydrocarbon reactants and, in any event, will ordinarily contaminate and be difficult to separate from the hydrocarbon conversion products. To accomplish this, steam or other relatively inert gas may be introduced through line 42 and valve 43 into the column of solid particles passing through the transfer conduit 32, connecting vessels 28 and 34, to flow upwardly through this column and substantially strip the same of regenerating gas or combustion gases. Also, the height and density of the column of solid particles in line 32 is preferably sufficient to preclude the flow of heated fluid from vessel 34 through line 32 into vessel 28.

In some instances, particularly when the reaction conducted in reactor 1 is of a highly endothermic nature, there may not be a sufficient deposit of combustible contaminants on the contact material to furnish all of the heat required for conducting the endothermic conversion reaction even when heat is recovered, as above described, from the outgoing regenerating gas and supplied to the reactor. In such instances, I contemplate and specifically provide for burning regulated quantities of additional fuel either in the regenerator or in vessel 28, or both, in contact with the solid material therein. Burners 12 are provided, in the case illustrated, for supplying extraneous fuel and air for its combustion to the lower portion of the regenerator, when desired, and one or more suitable side arm combustion zones 44 are provided on vessel 28, wherein hot combustion gases may be generated from fuel and air supplied thereto through burners 45 and introduced into the bed of heat retentive material passing through vessel 28. Thus, means are provided for supplying additional heat to the reactor either in the subdivided solid contact material returned to this zone from the regenerator or in the stream of heated fluid supplied to the reactor from vessel 34, or both.

The provisions above described for burning extraneous fuel in vessel 28 make it possible to augment the heat supplied to the reaction zone in any desired amount independent of the provisions for burning extraneous fuel in the regenerating step. This feature is advantageous in that it permits supplying all of the necessary heat to the reaction zone without employing an excessively high temperature in the regenerating step. In other words, if the regenerator is operating at a temperature approaching the maximum desired and more heat is required in the reactor than that available in the regenerated catalyst or contact material from this zone and that available from the outgoing regenerating gas stream, the required quantity of extraneous fuel may be burned in chamber 28 to supply additional heat to the reaction zone in the stream of reactants and/or inert fluid being supplied to the reactor from chamber 34.

I claim as my invention:

1. A hydrocarbon conversion process which comprises subjecting the hydrocarbons to conversion conditions in contact with finely divided solid catalyst in a reaction zone, removing contaminated catalyst particles from said zone and supplying the same to a regenerating zone maintained at combustion temperature and containing a relatively dense bed of finely divided contaminated catalyst undergoing regeneration, passing an oxygen-containing gas upwardly through said bed at sufficient velocity to maintain the bed in a turbulent fluid-like condition, thereby forming a suspension of finely divided catalyst particles in combustion gases, removing resultant hot combustion gases containing suspended catalyst particles from the regenerating zone and passing the same through a relatively cool mass of coarser solid particles of heat-retentive material at a sufficiently low velocity to filter suspended catalyst particles from the gases and store heat in said material, thereafter passing a relatively cool fluid through the thus heated mass of coarser material at a sufficiently high velocity to strip fine catalyst particles from the heated mass, thereby transferring heat from said mass to said fluid, and introducing the thus heated fluid containing the suspended catalyst particles to said reaction zone.

2. A hydrocarbon conversion process which comprises subjecting the hydrocarbons to conversion conditions in contact with finely divided solid catalyst in a reaction zone, removing contaminated catalyst particles from said zone and supplying the same to a regenerating zone maintained at combustion temperature and containing a relatively dense bed of finely divided contaminated catalyst undergoing regeneration, passing an oxygen-containing gas upwardly through said bed at sufficient velocity to maintain the bed in a turbulent fluid-like condition, thereby forming a suspension of finely divided catalyst particles in combustion gases, removing resultant hot combustion gases containing suspended catalyst particles from the regenerating zone and passing the same through a confined zone in countercurrent contact with a downwardly moving relatively cool mass of coarser solid particles of heat retentive material at a sufficiently low velocity to filter suspended solid catalyst particles from the gases and store heat in the moving mass, thereafter passing said mass downwardly through a separate confined zone in countercurrent contact with a relatively cool stream of fluid to abstract heat from the mass, maintaining the velocity of the last named stream flowing through said separate confined zone sufficiently high to strip fine catalyst particles from said mass, removing the thus heated fluid containing suspended catalyst particles from the last named zone and introducing the same to said reaction zone, separately removing resulting cooled and substantially stripped coarser particles from said separate confined zone and returning the same to the first named confined zone.

3. A process such as defined in claim 1, wherein said fluid is relatively inert to the conversion reaction taking place in said reaction zone and is employed to reduce the effective operating pressure in the reaction zone.

4. A process such as defined in claim 1, wherein said fluid comprises steam.

5. A process such as defined in claim 1, wherein said fluid comprises water which is converted to steam by contact with said hot heat-retentive material.

6. A process such as defined in claim 1, wherein said fluid comprises a mixture of hydrocarbons to be converted in said reaction zone with a relatively inert fluid.

7. A process such as defined in claim 1, wherein said fluid comprises $H_2O$ and hydrocarbons to be converted in said reaction zone.

8. The process as defined in claim 1 further characterized in that said fluid comprises at least a portion of the hydrocarbons to be converted in said reaction zone.

9. The process as defined in claim 2 further characterized in that said fluid comprises at least a portion of the hydrocarbons to be converted in said reaction zone.

FRIEDRICH W. LEFFER,
Naturalized as Frederick W. Leffer.